United States Patent
Frank et al.

(10) Patent No.: US 9,537,374 B2
(45) Date of Patent: Jan. 3, 2017

(54) ROTOR FOR AN ELECTRIC MACHINE

(75) Inventors: Michael Frank, Uttenreuth (DE); Peter van Hasselt, Erlangen (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 593 days.

(21) Appl. No.: 13/825,827

(22) PCT Filed: Sep. 22, 2011

(86) PCT No.: PCT/EP2011/066544
§ 371 (c)(1),
(2), (4) Date: Mar. 25, 2013

(87) PCT Pub. No.: WO2012/049002
PCT Pub. Date: Apr. 19, 2012

(65) Prior Publication Data
US 2013/0187491 A1    Jul. 25, 2013

(30) Foreign Application Priority Data
Sep. 27, 2010 (DE) .................. 10 2010 041 456

(51) Int. Cl.
*H02K 9/20* (2006.01)
*H02K 55/04* (2006.01)
*H02K 55/00* (2006.01)

(52) U.S. Cl.
CPC ............. *H02K 9/20* (2013.01); *H02K 55/00* (2013.01); *H02K 55/04* (2013.01); *Y02E 40/625* (2013.01)

(58) Field of Classification Search
None
See application file for complete search history.

(56) References Cited

U.S. PATENT DOCUMENTS

| 3,891,875 | A |  | 6/1975 | Laskaris |
| 4,101,793 | A | * | 7/1978 | Berthet et al. ............ 310/52 |
| 4,228,374 | A | * | 10/1980 | Elsel ....................... 310/53 |
| 4,365,175 | A |  | 12/1982 | Eckels |
| 6,708,503 | B1 | * | 3/2004 | Wang et al. ............ 62/51.1 |
| 7,509,815 | B2 |  | 3/2009 | Van Hasselt |
| 2002/0171322 | A1 | * | 11/2002 | Dawson et al. ........ 310/261 |
| 2006/0113851 | A1 | * | 6/2006 | Ishihara et al. ........ 310/52 |
| 2006/0293189 | A1 | * | 12/2006 | Ries ..................... 505/100 |

FOREIGN PATENT DOCUMENTS

| DE | 2448900 A1 | 4/1975 |
| DE | 10303307 A1 | 8/2004 |
| JP | H04-285463 A | 3/1991 |
| JP | 2006515980 A | 1/2003 |

* cited by examiner

*Primary Examiner* — Tran Nguyen

(57) ABSTRACT

A rotor form electric machine is provided including a rotor body that rotates about an axis of rotation, the rotor body having a superconducting rotor winding and cooling arrangement provided for cooling the rotor winding having at least one pair of cooling tube loops disposed substantially radially opposite each other on the rotor body, wherein a cryogenic coolant is transported in the axial direction in the coolant tube loops from a first axial rotor end to a second, opposite axial rotor end and back when the rotor rotates about the axis of rotation. One or more connecting tubes are provided in the cooling arrangement and connect one cooling tube loop to the other cooling tube loop of the at least one pair of cooling tube loops.

12 Claims, 3 Drawing Sheets

ROTOR FOR AN ELECTRIC MACHINE

CROSS REFERENCE TO RELATED APPLICATIONS

This application is the US National Stage of International Application No. PCT/EP2011/066544, filed Sep. 22, 2011 and claims the benefit thereof. The International Application claims the benefits of German application No. 10 2010 041 456.5 DE filed Sep. 27, 2010. All of the applications are incorporated by reference herein in their entirety.

FIELD OF INVENTION

The invention relates to a rotor for an electric machine and to a corresponding electric machine.

BACKGROUND OF INVENTION

It is known from the prior art to utilize rotors having superconducting rotor windings for electric machines such as e.g. synchronous motors and synchronous generators. Such rotors are preferably used in power plant generators for generating electric power, wherein higher power densities, lower losses and additional advantages are achieved by the rotating superconducting winding of the rotor. In order to produce superconduction in the rotor winding in rotors of said kind, said rotors are provided with a cooling tube system in which cryogenic coolant such as e.g. helium, hydrogen, neon or nitrogen circulates automatically. The coolant is caused to circulate by the centrifugal force produced by rotation of the rotor.

Publication DE 103 03 307 A1 describes a rotor with superconducting rotor winding and a cooling system in the form of cooling tube loops which are provided on two radially opposite sides of the rotor. In this arrangement said cooling tube loops are connected to a coolant reservoir. During rotation operation the coolant is conveyed from the reservoir into the cooling tube loops and from there back into the reservoir.

In the case of known rotors with superconducting winding and corresponding cooling system it has been found disadvantageous that when the rotor is not rotating the coolant always flows into the geodetically lower cooling tubes and therefore uniform cooling of the rotor winding cannot be achieved while the rotor is stationary. If the rotor is cooled without rotation, e.g. in a cooling process disposed upstream of normal rotor operation, this results in coolant flowing through at most only half of the cooling tubes, which can lead to undesirable thermally induced stresses. Consequently, it must be ensured that the coolant flows through the entire cooling tube system even outside of normal operation of the rotor. In conventional rotors this can only be achieved by rotating the rotor continuously or at intervals, which, however, makes it necessary to install a drive for the rotor.

SUMMARY OF INVENTION

The object of the invention is to create a rotor for an electric machine, the superconducting rotor winding of which is uniformly cooled even when the rotor is stationary.

This object is achieved by the rotor as claimed in the claims and the electric machine as claimed in the claims. Developments of the invention are defined in the dependent claims.

The rotor according to the invention comprises a rotor body that is rotatable about an axis of rotation, said body having a superconducting rotor winding which consists in particular of high-$T_c$ superconductor material, and a cooling arrangement provided to cool the rotor winding, said arrangement having at least one pair of cooling tube loops which are disposed on the rotor body in a substantially radially opposite manner. When the rotor rotates about the axis of rotation, a cryogenic coolant (e.g. neon, hydrogen, helium or nitrogen) is conveyed in the cooling tube loops in the axial direction (i.e. in the direction of the axis of rotation) from a first axial rotor end to a second, opposite axial rotor end and back. The term cooling tube loop is to be interpreted in this context in a broad sense, and in particular a cooling tube loop may in some cases consist not only of a single cooling line, but also of a plurality of cooling lines running side-by-side in parallel.

The rotor according to the invention is characterized in that in the cooling arrangement one or more connecting tubes are provided which connect one cooling tube loop to the other cooling tube loop of the at least one pair of cooling tube loops. This allows a direct exchange of coolant between the opposite cooling tube loops of a pair of cooling tube loops such that even when the rotor is stationary coolant can travel from the geodetically lower cooling tube loop to the higher cooling tube loop. As part of a cooling process disposed upstream of the actual operation of the rotor, the still hot rotor causes the coolant in the geodetically lower cooling tube loop to evaporate, whereby liquid coolant is conveyed via the connecting tube(s) into the geodetically higher cooling tube loop in the manner of a bubble pump, thereby causing the coolant to circulate between the cooling tube loops. Uniform cooling of the rotor winding can therefore be inventively achieved even when the rotor is stationary.

Apart from the connecting tube(s) provided, the rotor according to the invention can be of per se known design. In particular, the rotor can be similar to the rotor disclosed in the publication DE 103 03 307 A1. The entire disclosure of said publication is incorporated by reference in the present application.

In a particularly preferred embodiment variant, the rotor has a two-pole rotor winding with a single pair of cooling tube loops. During operation of the electric machine, in which the rotor is supplied with direct current, a magnetic field having a north and a south pole is then formed. However, in some cases it is also possible for the rotor to have a rotor winding with a plurality of magnetic pole pairs, in which case the number of pairs of cooling tube loops corresponds to the number of pole pairs.

In another particularly preferred embodiment variant of the rotor according to the invention, the coolant is circulated using a coolant reservoir which is provided at the first axial rotor end. Said reservoir is connected to the corresponding cooling tube loops of the pair(s) of cooling tube loops.

In a particularly preferred variant of the rotor according to the invention, at least one connecting tube which interconnects the cooling tube loops is a straight tube section which extends radially from one cooling tube loop to the other cooling tube loop of the at least one pair of cooling tube loops. The advantage of using a radial connecting tube is that, during rotation operation, the tube is very well able to mechanically absorb the centrifugal forces acting on the cooling tube loops, therefore possibly eliminating the need for additional supporting devices.

Instead of or in addition to straight tube sections, one or more connecting tubes can possibly also be embodied as curved, in particular implemented as substantially semicircular tube sections, the diameter of which preferably corresponds to the distance between two opposite cooling tube loops. In order to distribute coolant efficiently between the cooling tube loops, two curved tube sections are preferably provided as connecting tubes for one pair of cooling tube loops, in particular two substantially semicircular tube sections which together form a complete circle.

In another particularly preferred embodiment variant, the connecting tube(s) is (are) provided at the second axial rotor end. The advantage of this variant is that the connecting tubes can run past the outside of the rotor body and do not therefore have to be integrated in the rotor body, thereby simplifying rotor manufacture.

In another particularly preferred embodiment variant, a cooling tube loop comprises one or possibly more U shapes, wherein, during rotation of the rotor, coolant is conveyed along one leg of the U shape from the first axial rotor end to the second axial rotor end and is fed from there via an intermediate section into the other leg of the U shape in which it is conveyed back to the first axial rotor end. At least one connecting tube preferably connects the intermediate sections of the U shapes of a pair of opposite cooling tube loops. Since this intermediate section, which constitutes the turning point of the coolant, is preferably located outside the rotor winding or rather the rotor body for manufacturing reasons, a simple connection of the cooling tube loops is thereby created.

In another particularly preferred embodiment variant, one or more means of coolant heating are provided on at least one cooling tube loop. The advantage of this variant of the invention is that circulation of the coolant is achieved with the rotor stationary, even when the entire circumference of the rotor winding has been cooled down to the temperature required for superconduction. This is due to the fact that evaporation of the coolant is produced by the coolant heating means, so that the bubble pump effect described above is again achieved. The one or more coolant heating means can be embodied for example as one or more connectable heating elements, so that coolant evaporation and therefore the bubble pump effect can be actively produced as and when required.

Since the rotor winding and the cooling tube loops are generally thermally insulated from the environment, the one or more coolant heating means may possibly also comprise one or more heat leaks in the corresponding thermal insulation. The thermal insulation is preferably constituted by a so-called cryostat which contains the cooling tube loops and the rotor winding.

In another embodiment variant of the rotor according to the invention, one or more coolant heating means for a pair of cooling tube loops are provided only on one cooling tube loop of the pair. This arrangement therefore manages with a small number of coolant heating means. Care must merely be taken to ensure that, when the already cooled rotor is stationary, coolant is only caused to circulate if the cooling tube loop having the one or more coolant heating means is geodetically lower than the cooling tube loop without such means.

In addition to the rotor described above, the invention also includes an electric machine which is embodied in particular as a power plant generator for generating electric power, wherein the electric machine comprises the rotor according to the invention or a preferred embodiment variant of the rotor according to the invention.

BRIEF DESCRIPTION OF THE DRAWINGS

Exemplary embodiments of the invention are described in detail below with reference to the attached drawings, in which.

DETAILED DESCRIPTION OF INVENTION

The rotors described below are used in large superconducting generators such as e.g. power plant generators having outputs of between 100 and 1000 MW. The rotor is fed therein by direct current and comprises a superconducting rotor winding which generates one or more magnetic pole pairs when current is flowing. Here the rotor is disposed in a corresponding stator (not shown) having a stator winding, said stator winding consisting of a conventional metal material and not a superconductor. Two-pole rotors whose rotor winding forms two magnetic poles will now be considered.

Figure 1:
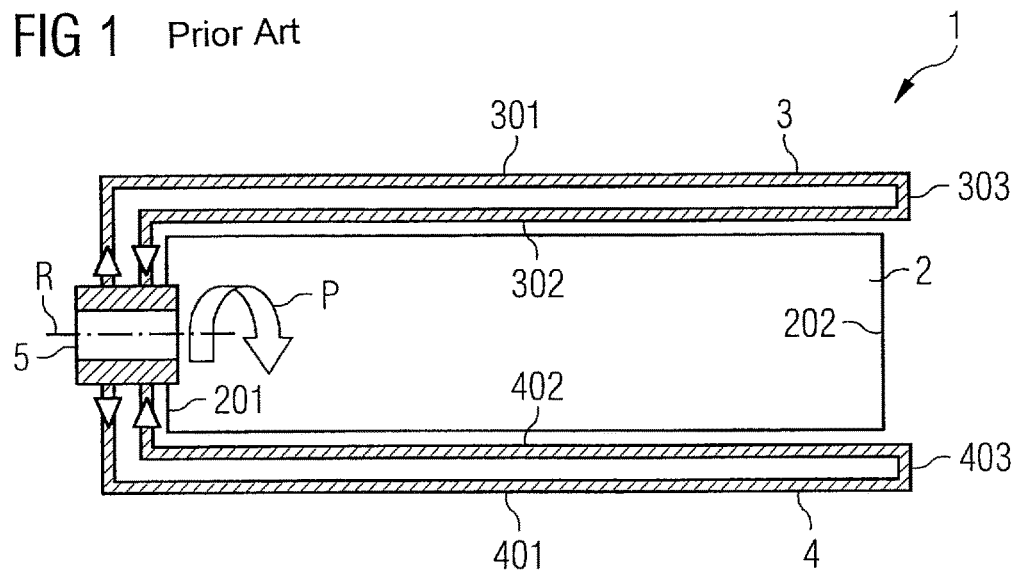
FIG. 1 and FIG. 2 show a rotor of an electric machine according to the prior art in different operating situations.

FIG. 1 schematically illustrates a two-pole rotor according to the prior art. Said rotor can be of similar design to the rotor described in the publication DE 103 03 307 A1. The rotor 1 comprises a merely schematically depicted cylindrical rotor body 2 which during operation rotates about the axis of rotation R shown. In the rotor position in FIG. 1, the superconducting rotor winding (not shown for the sake of clarity) extends from a first axial end 201 of the rotor body along the top of the rotor body to a second axial end 202 of the rotor body and from there in a radially downward direction and then along the underside of the rotor body from the second axial end 202 back to the first axial end 201 of the rotor body.

In order to achieve superconduction in the rotor winding, the latter must be suitably cooled using a cryogenic coolant such as neon, for example. For this purpose a coolant circuit is used which comprises a cooling reservoir 5 and two cooling tube loops 3 and 4 which are also referred to as thermosiphoning loops. In this arrangement the cooling tube loops are disposed adjacent to the rotor winding conductors. To provide thermal insulation from the environment, the cooling tube loop and the rotor winding are disposed in a cryostat (no shown) which can be of similar design to the cryostat in the publication DE 103 03 307 A1. In FIG. 1 and in all the subsequent figures the coolant in the liquid phase inside the cooling circuit is indicated by hatching, whereas coolant in the gaseous phase is represented by white areas.

The cooling tube loops 3 and 4 in FIG. 1 are embodied as U-shaped and comprise two legs 301, 302 and 401, 402, respectively, extending in the axial direction of the rotor, wherein the two legs of the respective cooling tube loop are interconnected by an intermediate tube 303 and 403, respectively. For illustrative purposes, the legs and the intermediate tube are disposed in the plane of the sheet.

FIG. 1 shows the operation of the rotor 1 with rotation, the rotation being indicated by the arrow P. Due to the centrifugal force caused by the rotation, the coolant is forced out of the reservoir 5 into the corresponding legs of the two cooling tube loops 3 and 4, thereby causing a circulation of the coolant from the reservoir into the leg 301 and from there via the leg 302 back into the reservoir and, similarly, from the reservoir 5 into the leg 401 and from there via the leg 402 back into the reservoir. This circulation produces suitable cooling of the rotor winding. The circulation of the coolant is indicated in FIG. 1 and all the subsequent figures by triangles on the cooling tubes.

Figure 2:
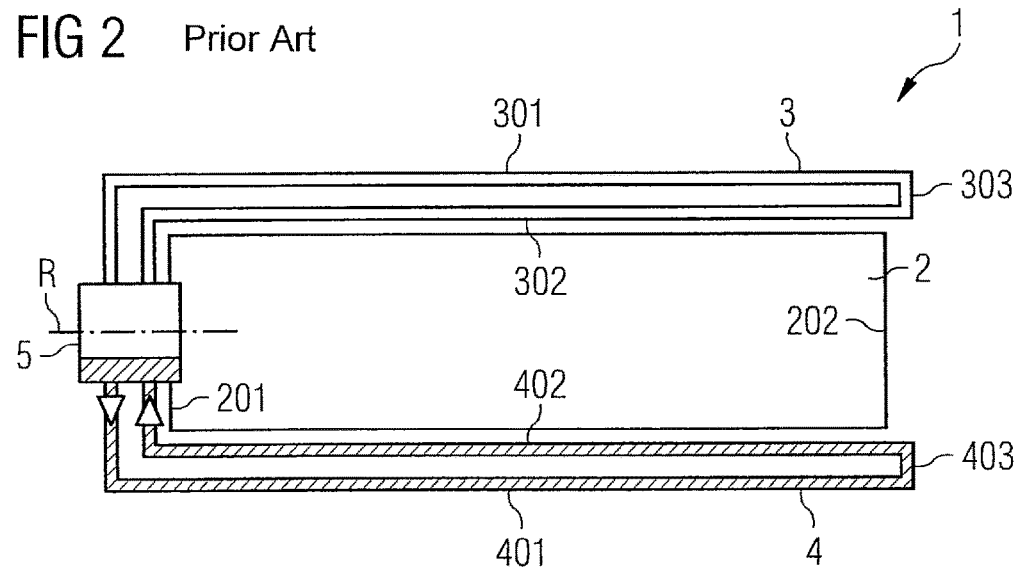

Prior to the starting-up of the electric machine according to FIG. 1, the rotor and in particular the rotor winding thereof must first be cooled below the critical temperature of the superconductor by the coolant in the thermosiphoning system in a lengthy cooling process. The problem here is that the rotor is generally not rotating and therefore no centrifugal force is acting on the coolant. Consequently, the coolant can only flow to geodetically lower points, with the result that only half of the rotor winding is cooled. Such a scenario is depicted in FIG. 2. It can be seen that, in the absence of centrifugal force, coolant is now caused to circulate only in the lower cooling tube loop 4. The circulation comes about due to the fact that in the cooling process the coolant is heated because of the still hot rotor and thus evaporates, thereby causing coolant to flow in the tubes. As part of the cooling process it is currently proposed to continue rotating the rotor either continuously or at sufficiently short intervals, thereby cooling the two cooling tube loops evenly. The disadvantage of this is that a drive is required for turning the rotor during the cooling process, which involves a high degree of cost and/or complexity.

Figure 3:
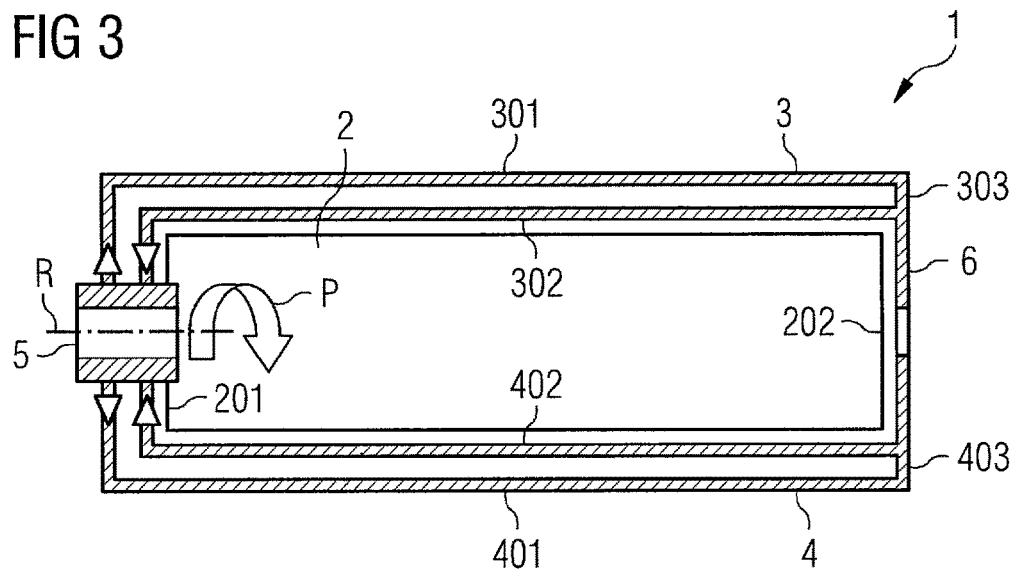
FIG. 3 to FIG. 5 show exemplary embodiment variants of a rotor according to the invention in different operating situations.

FIG. 3 shows an embodiment variant of a rotor according to the invention which overcomes the above disadvantages. The rotor is in this case of similar design to that in FIG. 1 and FIG. 2, and so the same components or rather corresponding components are denoted by the same reference signs and will not be described again. In contradistinction to the rotor in FIG. 1 or FIG. 2, an additional cooling line in the form of a radial connecting tube 6 which connects the upper cooling tube loop 3 to the lower cooling tube loop 4 at the axial end 202 of the rotor body 2 is now provided in the thermosiphoning system. Said connecting tube in this case forms a T-section with the corresponding intermediate tubes 303 and 403. Instead of a radial connecting tube, one or more connecting tubes of other shapes, such as e.g. curved connecting tubes and in particular two semicircular connecting tubes, can be used to connect the cooling tube loops. FIG. 3 shows the normal operation of the rotor with rotation. It can be seen that the connecting tube 6 does not impair said operation. In particular, the centrifugal force again causes the coolant to circulate in the two cooling tube loops 3 and 4, coolant being in the liquid and gaseous phase in the connecting tube 6.

Figure 4:
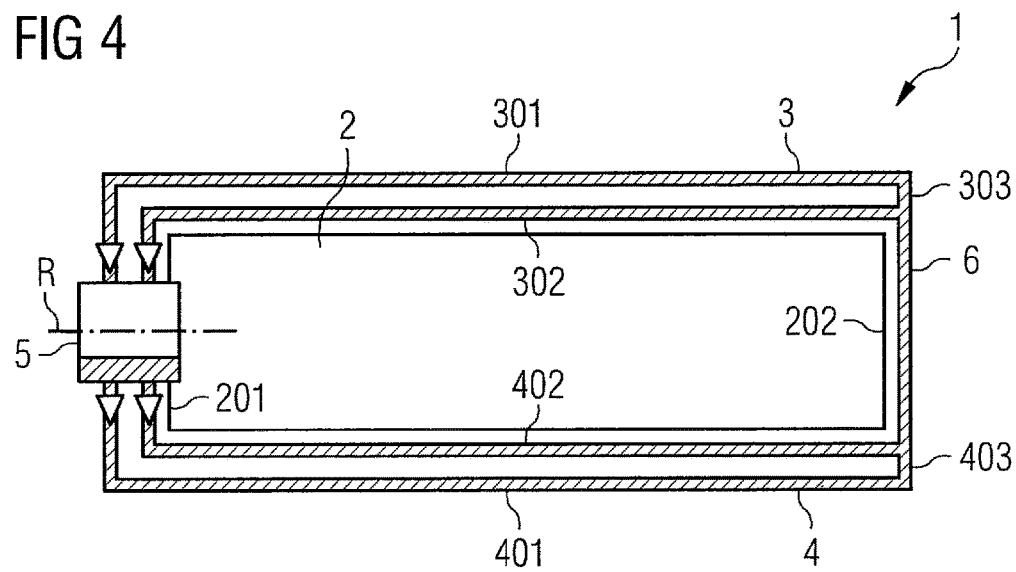

FIG. 4 now shows the non-rotating mode of the rotor of FIG. 3 during the cooling phase prior to start-up of the electric machine, i.e. the rotor being stationary. Coolant circulation nevertheless takes place such that coolant flows from the reservoir 5 into the lower legs 401 and 402 of the cooling tube loop 4 and from there via the connecting tube 6 into the legs 301 and 302 of the upper cooling tube loop 3 and thus back into the coolant reservoir 5. This circulation is caused by the coolant flowing into the cooling pipes 401 and 402 being heated due to the still hot rotor and therefore evaporating. In the tube 6, the evaporating liquid is carried along by the already evaporated coolant and is thus also fed without difficulty to the geodetically higher tube sections 301 and 302. This behavior is also known as the bubble pump effect.

The bubble pump effect operates automatically as part of the cooling process because of the hot rotor. Once the rotor is completely cooled, the bubble pump effect no longer occurs. In order nonetheless to achieve a uniform flow of coolant through the cooling tube loops during operation also during stationary phases of the rotor, in a modified embodiment variant of a rotor according to the invention a heating device is used. This modified embodiment variant is shown schematically in FIG. 5.

Figure 5:
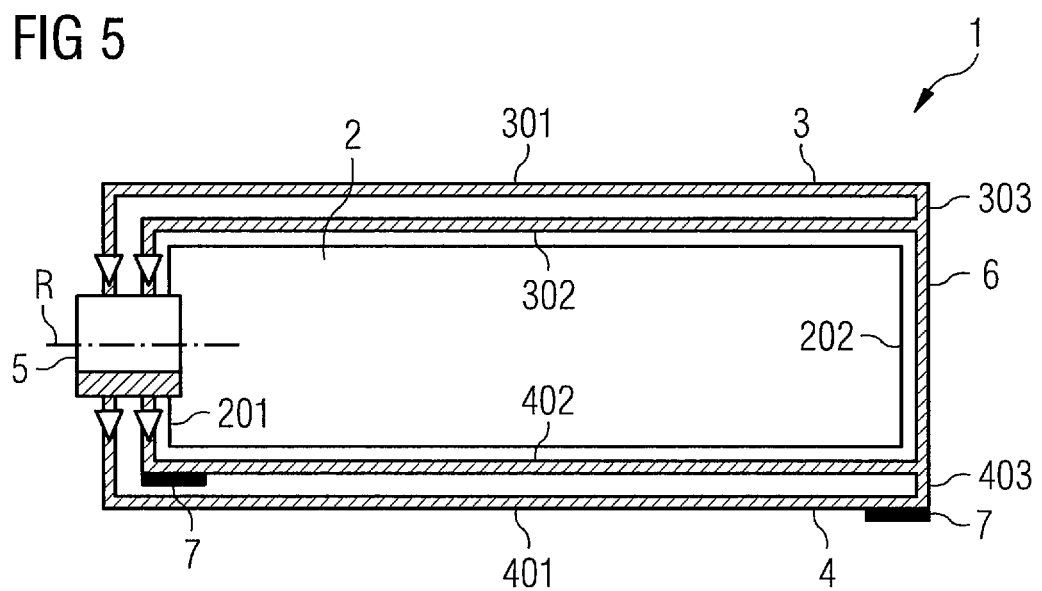

The design of the rotor according to FIG. 5 substantially corresponds to that of the rotor shown in FIG. 3 and FIG. 4. Additionally, however, two connectable electric heating elements 7 are provided on the cooling tubes 401 and 402 of the lower cooling tube loop 4. In this case one of the heating elements is located at the first axial end 201 of the rotor body and the other heating element at the second axial end 202 of the rotor body. If the rotor becomes stationary, the heating elements are activated, causing the coolant in the cooling tubes 401 and 402 to evaporate, which in turn produces the bubble pump effect described above, so that coolant circulates evenly through the lower cooling tube loop 4 and the upper cooling tube loop 3. If rotation of the rotor is resumed, the heating elements are switched off, since the coolant will be caused to circulate by the centrifugal force of the rotation.

The embodiment variants of the rotor according to the invention described in the foregoing have a number of advantages. Installing a connecting line between the cooling tube loops of the rotor provides a simple means of operating the thermosiphoning system as a bubble pump, so that coolant flows uniformly through both cooling tube loops of the rotor even without rotation. It is therefore no longer necessary for the rotor to rotate during its cooling phase, thereby considerably facilitating rotor start-up. In addition, the cooling rate is approximately a factor of 2 higher than for cooling in which the rotor is turning continuously or at intervals, since twice as many thermosiphoning loops are active. Connecting the opposite cooling tube loops using a connecting tube provides the further advantage that it not only enables the thermosiphoning system to operate as a bubble pump, but also that the centrifugal forces occurring during rotation of the rotor and acting on the rotor sections disposed in this region outside the winding are also absorbed by the connecting tube.

The invention claimed is:

1. A rotor for an electric machine, comprising:
   a rotor body that is rotatable about an axis of rotation wherein the rotor body includes a superconducting rotor winding; and
   a cooling arrangement provided for cooling the rotor winding,
   wherein the cooling arrangement includes a pair of cooling tube loops that are disposed on the rotor body in an substantially radially opposite manner,
   wherein during rotation of the rotor about the axis of rotation a cryogenic coolant is conveyed in the cooling tube loops in an axial direction from a first axial rotor end to a second, opposite axial rotor end and back,
   wherein the cooling arrangement includes a connecting tube that connect one cooling tube loop to the other cooling tube loop of the pair of cooling tube loops.

2. The rotor as claimed in claim 1, further comprising a two-pole rotor winding with the pair of cooling tube loops.

3. The rotor as claimed in claim 1, wherein, at the first axial rotor end, a coolant reservoir is provided that is connected to the cooling tube loops.

4. The rotor as claimed in claim 1, wherein the connecting tube is a straight tube section extending radially from one cooling tube loop to the other cooling tube loop of the pair of cooling tube loops.

5. The rotor as claimed in claim 1, wherein the connecting tube is provided at the second axial rotor end.

6. The rotor as claimed in claim 1,
   wherein a cooling tube loop is U-shaped, and
   wherein, during rotation of the rotor about the axis of rotation, coolant is conveyed along one leg of the U shape from the first axial rotor end to the second axial rotor end and from there via an intermediate section into the other leg of the U shape wherein the coolant is returned to the first axial rotor end.

7. The rotor as claimed in claim 6, wherein the connecting tube connects the intermediate sections of the U shapes of a pair of opposite cooling tube loops.

8. The rotor as claimed in claim 1, wherein a coolant heating means is provided on the cooling tube loop.

9. The rotor as claimed in claim 8, wherein the coolant heating means includes a heating element.

10. The rotor as claimed in claim 8, wherein the coolant heating means comprises a heat leak in a thermal insulation.

11. The rotor as claimed in claim 8, wherein for the pair of cooling tube loops a coolant heating means is provided only on one cooling tube loop of the pair.

12. An electric machine, comprising:
a rotor as claimed in claim 1.

* * * * *